COMBINATION LOCK DEVICE

Filed Dec. 3, 1959

7 Sheets-Sheet 1

INVENTOR
ROBERT C. PITNEY
ALVA G. RUSSELL
BY
William W. Holtow Jr.
ATTORNEY

COMBINATION LOCK DEVICE

Filed Dec. 3, 1959

INVENTOR
ROBERT C. PITNEY
ALVA G. RUSSELL
BY
William W. Volten, Jr.
ATTORNEY

COMBINATION LOCK DEVICE

Filed Dec. 3, 1959 7 Sheets-Sheet 3

INVENTOR
ROBERT C. PITNEY
ALVA G. RUSSELL
BY
William W. Dalton Jr.
ATTORNEY

May 15, 1962 R. C. PITNEY ETAL 3,034,329

COMBINATION LOCK DEVICE

Filed Dec. 3, 1959 7 Sheets-Sheet 4

INVENTOR
ROBERT C. PITNEY
ALVA G. RUSSELL
BY
William W. Holton Jr.
ATTORNEY

INVENTOR
ROBERT C. PITNEY
ALVA G. RUSSELL
BY
William W. Holloway Jr.
ATTORNEY

May 15, 1962 R. C. PITNEY ETAL 3,034,329

COMBINATION LOCK DEVICE

Filed Dec. 3, 1959 7 Sheets-Sheet 6

INVENTOR
ROBERT C. PITNEY
ALVA G. RUSSELL
BY
William W. Holton Jr.
ATTORNEY

COMBINATION LOCK DEVICE

Filed Dec. 3, 1959

INVENTOR
ROBERT C. PITNEY
ALVA G. RUSSELL
BY
William W. Dalton Jr.
ATTORNEY

United States Patent Office 3,034,329
Patented May 15, 1962

3,034,329
COMBINATION LOCK DEVICE

Robert C. Pitney and Alva G. Russell, Stamford, Conn., assignors to Pitney-Bowes, Inc., Stamford, Conn., a corporation of Delaware
Filed Dec. 3, 1959, Ser. No. 857,081
8 Claims. (Cl. 70—314)

This invention relates to locking devices, and more particularly to such devices which incorporate a combination lock.

According to the embodiment of the invention as particularly disclosed herein, a combination lock is provided with means for simply and expeditiously altering the correct combination for unlocking the same. The additional feature is incorporated whereby the correct combination is altered each time the combination lock is unlocked and relocked; this alteration being in accordance with a predetermined random pattern. This leads to the advantages that disclosure of the correct combination to a person who does not know the predetermined random pattern allows that person to unlock the lock only once, ensuring that, thereafter, the secret of the correct combination remains inviolate and that that person is relieved of further responsibility in connection with knowledge of the correct combination. This embodiment takes the form of a metering machine including a descending register or counter which keeps track of the amount or value of the thing metered and which has associated therewith means for preventing operation of the metering machine when the amount or value indicated by the register is below a predetermined minimum. The further feature is provided by this embodiment whereby the register is reset by a predetermined additional amount each time the combination lock is unlocked and then relocked. In practice, the next succeeding correct combination will be disclosed to the user of the metering machine upon payment by him of a fee corresponding to a predetermined additional amount by which the register will be reset. Then, the user enters the correct combination into the combination lock to unlock it and, with relocking of the lock, the register is so reset and the correct combination is altered according to the predetermined random pattern. In this manner, resetting of the register can be accomplished by the user merely by informing him of the next succeeding correct combination.

Accordingly, an object of this invention is to provide a combination lock having new and improved means for simply and expeditiously altering the correct combination for unlocking the same. A further object is to provide a combination lock having new and improved means for altering the correct combination each time the combination lock is unlocked and relocked.

A further object of the present invention is to provide a new and improved metering machine which is prevented from operating when a predetermined amount or value has been metered and which can be reset by the user to permit the metering of a predetermined additional amount or value merely by informing the user of the then correct combination of a combination lock associated with the metering machine, which correct combination is altered according to a predetermined random pattern each time the register is so reset.

A further object of this invention is the provision of a new and improved metering machine incorporating a register and an actuating member adapted to be locked by a combination lock whereby unlocking of the combination lock permits operation of the actuating member to effect the functions of relocking the combination lock, altering the correct combination according to a predetermined random pattern, and resetting of the register by a predetermined amount.

Further objects and advantages will become apparent as the description proceeds.

An embodiment of the invention is shown in the accompanying drawings wherein.

Figure 1:
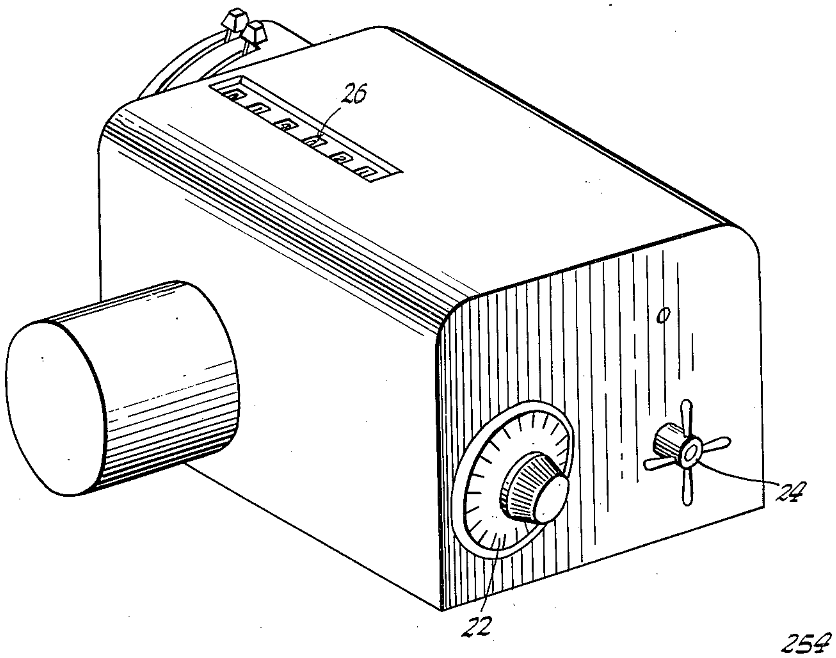
FIG. 1 is a perspective view of a metering machine embodying the present invention.

Referring to FIG. 1, a metering machine embodying the invention is generally designated by the reference numeral 20. This machine may be used for printing and metering value impressions such as postage, tax stamps and the like. As indicated in FIG. 1, metering machine 20 includes a dial 22, an actuating handle 24 and a registser 26. When dial 22 is operated according to the correct combination, the combination lock (later to be described) is unlocked. This releases actuating handle 24 which is then operated by rotating it 120° in the counterclockwise direction. This rotation of handle 24 accomplishes three interrelated functions, namely: (1) the combination lock is relocked thereby preventing subsequent operation of the actuation handle until the combination lock is again unlocked by again operating dial 22 according to the correct combination; (2) the correct combination is altered according to a predetermined random pattern; and (3) the register 26 is reset by a predetermined amount.

Figure 11:
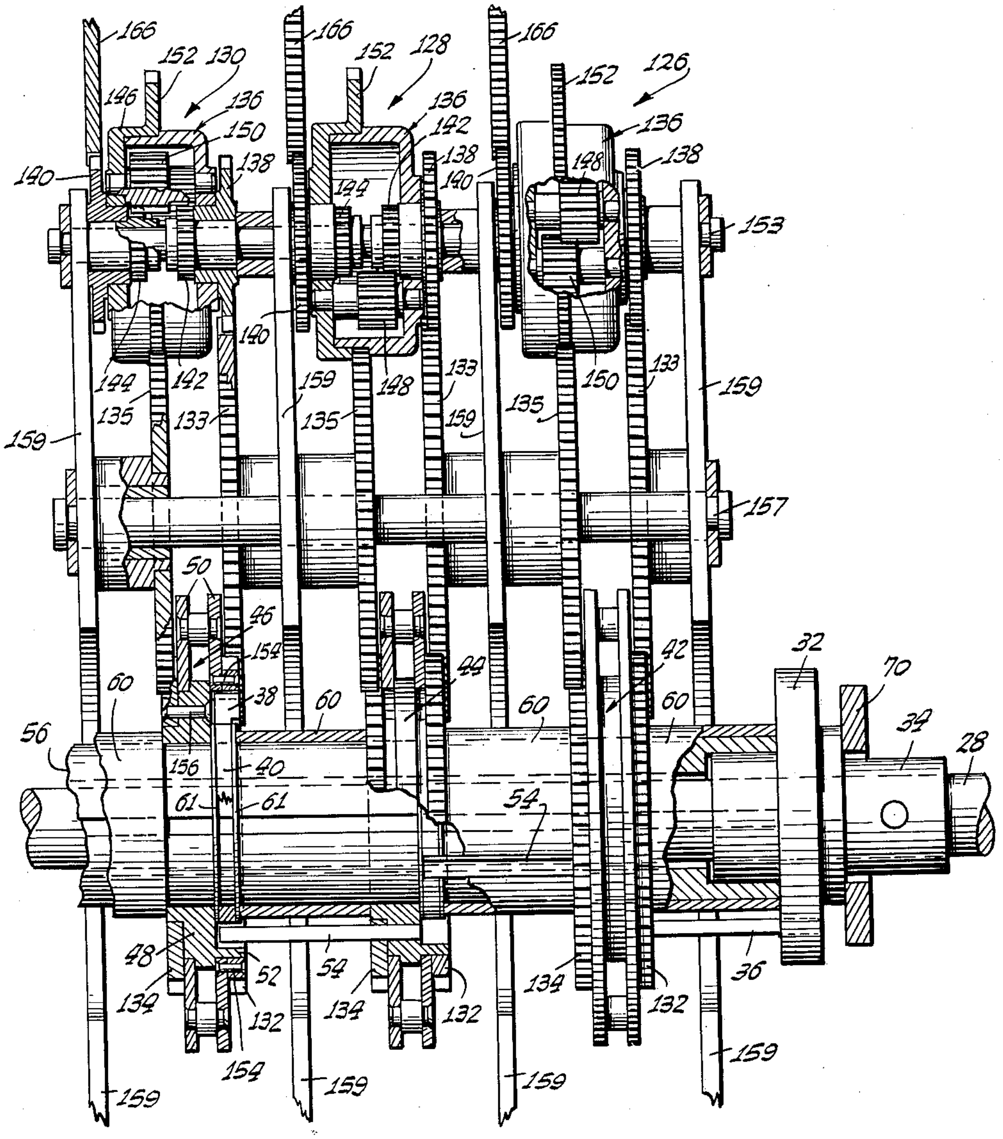
FIG. 11 is an enlarged, fragmentary view partly in section and with parts broken away, this view being taken in the direction of arrow 11 in FIG. 9 and showing details of the combination lock tumblers and the differential units connected thereto.

The combination lock referred to above will now be described. Dial 22 is fixed at one end of a rotatable shaft 28, this shaft being supported for rotation by an intermediate wall 30 and the front wall 31 of the casing of the metering machine. A drive wheel 33 has an integral hub 34, the latter being pinned and thereby fixed to shaft 28. Drive wheel 32 carries a lateral extension 36 (see FIGS. 4 and 11) whose free end is engageable with a radial projection 38 integral with a flyer 40 of a first tumbler generally designated at 42. Tumbler 42 is identical with each of two other tumblers generally designated at 44 and 46, respectively. Each of tumblers 42, 44 and 46 includes an inner hub member 48 and an outer annular disc member 50 as best shown in FIG. 11. Radial projection 38 of the flyer 40 of each of the tumblers is engageable with a laterally extending rim portion 52 of the hub member 48 of that tumbler. The hub member 48 of each of tumblers 42 and 44 carries a lateral extension 54 which is engageable with the radial projection 38 of the flyer 40 of the next tumbler whereby each of lateral extensions 54, 54 corresponds in structure and function to lateral extension 36 of drive wheel 32. Each of lateral extensions 36, 54, 54 has lost motion relative to the flyer 40 with which it is engageable, and the flyer of each of tumblers 42, 44 and 46 has lost motion relative to the rim portion 52 of that respective tumbler. Accordingly, dial 22 has a lost motion driving connection with tumbler 42, tumbler 42 has a lost motion driving connection with tumbler 44, and tumbler 44 has a lost motion driving connection with tumbler 46. The lost motion between dial 22 and tumbler 42, between tumblers 42 and 44, and between tumblers 44 and 46 is, in each case, one full revolution.

Rotatable shaft 28 extends through a sleeve 56 which is prevented from rotating by means of a dog 58 (see FIGS. 8 and 10) carried by intermediate wall 30. Each of tumblers 42, 44 and 46 is mounted for rotation about fixed sleeve 56, the respective tumblers being spaced from each other and from wall 30 and drive wheel 32 by means of hubs 60. A washer 61 is disposed at each side of the flyer 40 of each tumbler, and each of these washers is keyed to sleeve 56 thereby isolating each of the flyers from any tendency to frictionally drive the respectively adjacent hub 60 or tumbler hub 48.

So long as the hub 48 remains fixed relative to the outer disc 50 of each of tumblers 42, 44 and 46, the correct combination for opening the combination lock remains unchanged.

Figure 8:
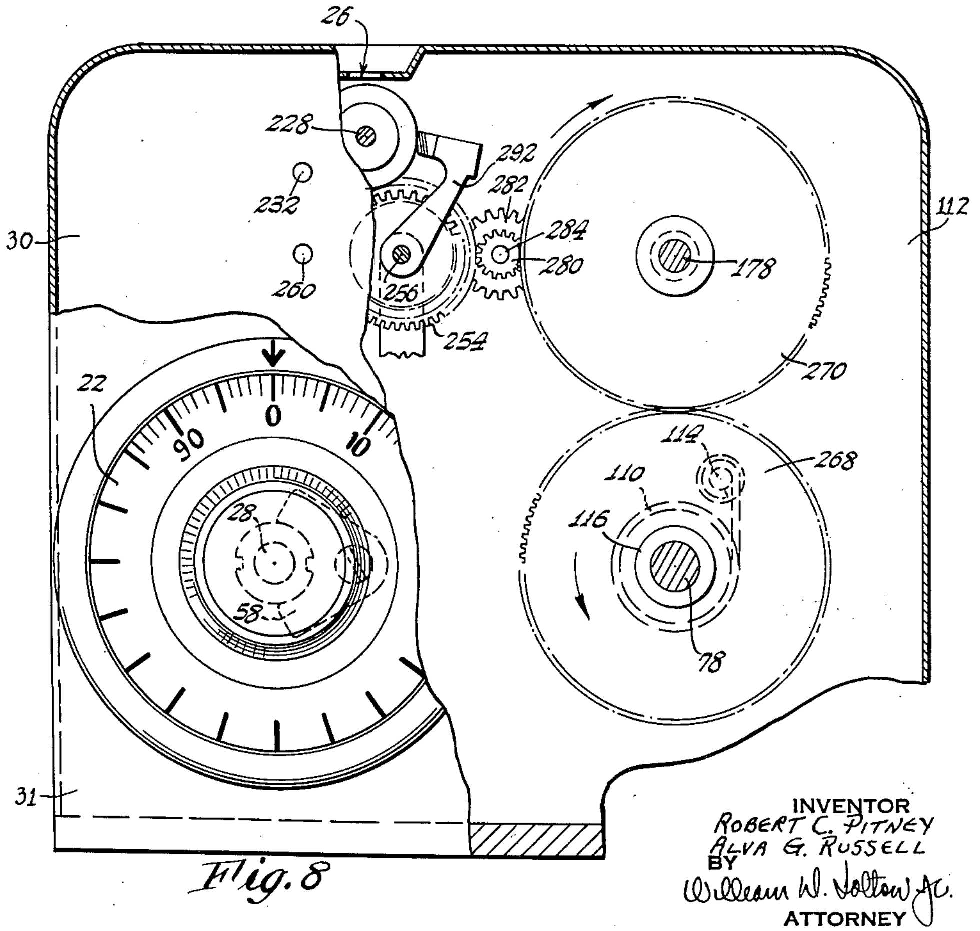
FIG. 8 is a front elevational view of the metering machine, this view being broken away in part and partly in section.

To unlock the combination lock, dial 22 is rotated three complete revolutions in the clockwise direction as viewed in FIGS. 1 and 8 to ensure that all the lost motion between the dial and all of the tumblers is taken up; and this clockwise rotation is then continued until the dial is stopped at the first number of the correct combination. This will leave a gate or slot 62 in the outer periphery of tumbler 46 aligned with a fence 64, the latter extending across all three of the tumblers. The dial is then rotated in the counterclockwise direction two full revolutions plus the amount necessary to bring the dial to the second number of the correct combination. This results in the take-up of the lost motion between the dial and tumbler 44 and movement of the latter to the position at which it stands with its gate 62 in alignment with fence 64. This counterclockwise rotation of dial 22 does not effect any movement of tumbler 46 because the lost motion between tumblers 46 and 44 is not taken up by anything less than three full reverse revolutions of the dial. The dial is then rotated in a clockwise direction one full revolution plus the amount necessary to bring the dial to the third number of the correct combination whereby the gate 62 of tumbler 42 is aligned with the fence 64. This latter clockwise rotation of the dial does not effect any movement of either of tumblers 44 and 46 because the lost motion between tumblers 42 and 44 will not be taken-up by anything less than two full reverse revolutions of the dial.

The gates 62 of all three of the tumblers being aligned with fence 64, the latter will subsequently be permitted to move into these gates. If any one of gates 62 is misaligned with fence 64, the fence cannot, of course, enter any of the gates. Fence 64 is carried by a fence lever 66, the latter being pivotally mounted on a pin 68 carried by a locking bolt 70 and urged in the counterclockwise direction by a spring 71. Bolt 70 rides in a slot provided by a bracket 72. Bolt 70 has a pair of slots 74 and 76 therein. Hub 34 of drive wheel 32 extends through slot 74, and an actuating shaft 78, which fixedly carries actuating handle 24, extends through slot 76. In this manner, bolt 70 is supported and guided for horizontal endwise movement.

Figure 5:
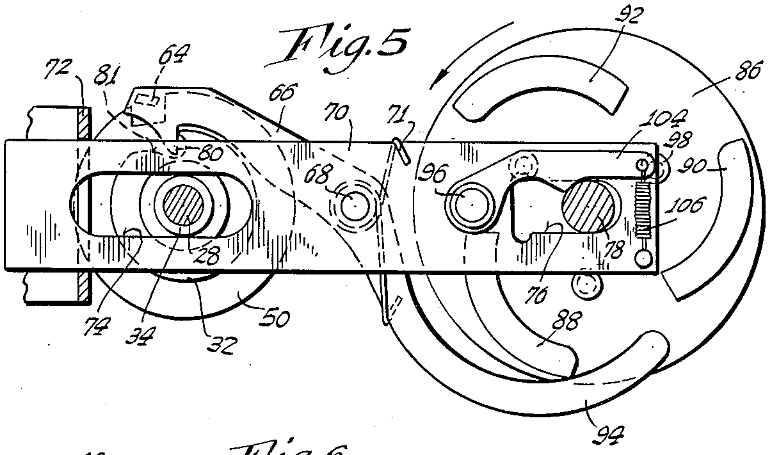
FIG. 5 is a sectional view taken along line 5—5 in FIG. 4 and showing the respective parts just after unlocking of the combination lock.
Figure 6:
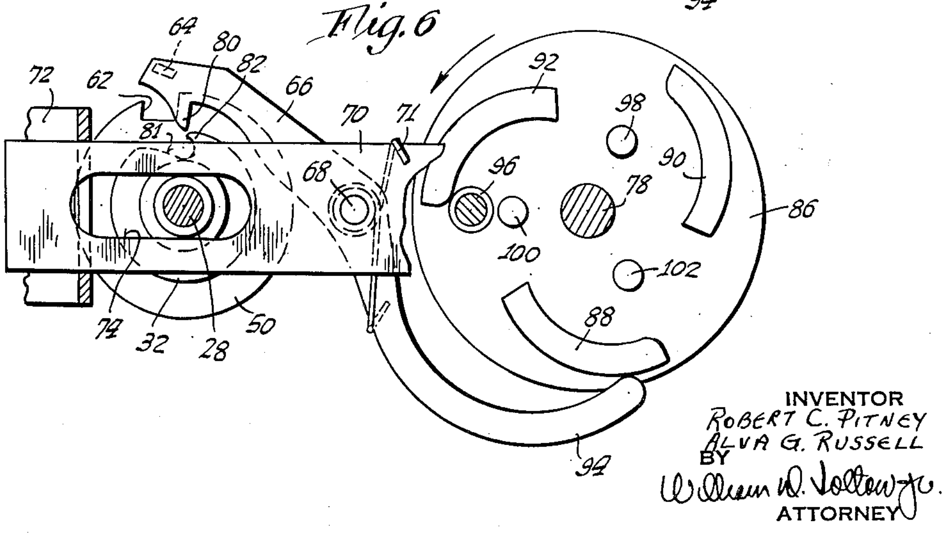
FIGS. 6 and 7 are views similar to FIG. 5 but showing the parts at a point during re-locking of the combination lock in FIG. 6 and after the combination lock has been re-locked in FIG. 7.

With fence 64 in alignment with the gates 62 of all three of the tumblers as shown in FIG. 5, movement of the fence into the gates is prevented only by a nose 80 of fence lever 66; this nose engaging the outer periphery of drive wheel 32. As can be seen in each of FIGS. 5 and 6, drive wheel 32 has an inwardly extending cam surface 81 and a projection 82.

Upon counterclockwise rotation of dial 22, nose 80 rides on the periphery of drive wheel 32 and then along cam surface 81 whereupon fence 64 enters the gates 62 of the tumblers. As this counterclockwise rotation continues, the projection 82 of drive wheel 32 moves against nose 80 of fence lever 66 to slide bolt 70 to its leftward retracted position whereby the combination lock is unlocked. This latter counterclockwise rotation of dial 22 does not cause rotation of any one of the three tumblers because anything less than a full reverse revolution of the dial will not take up the lost motion between drive wheel 32 and tumbler 42. If the gate 62 of any one or more of the tumblers is not aligned with fence 64 when drive wheel 32 is rotated in either direction, fence 64 will ride on the periphery of that one or more tumblers, thereby preventing nose 80 from riding on cam surface 81.

Figure 4:
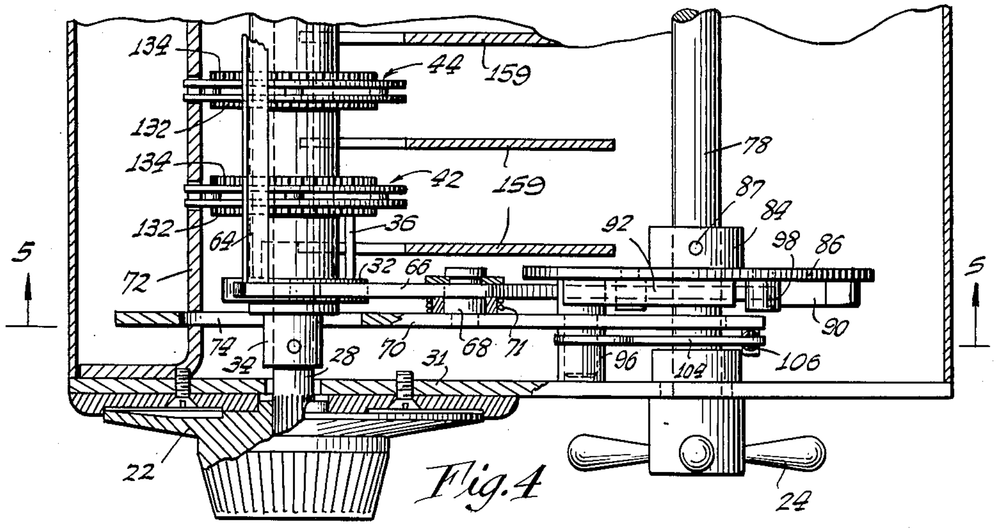
FIG. 4 is a sectional view taken substantially along line 4—4 in FIG. 9 and with certain of the parts removed for clarity of illustration, this view showing a portion of the combination lock of the metering machine.
Figure 7:
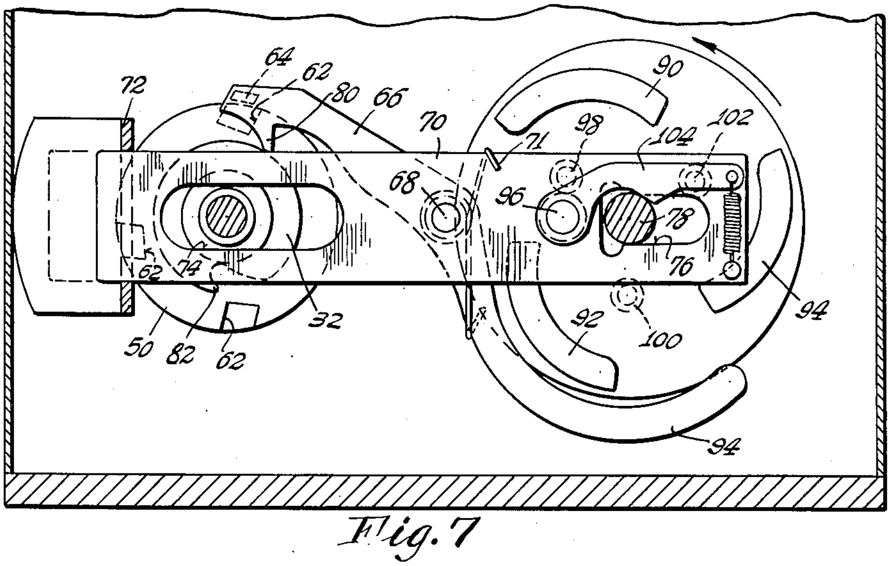

The combination lock, to the extent described above, is of conventional construction. Referring to FIG. 4, a hub 84 is integral with a cam disc 86, this hub being pinned at 87 to actuating shaft 78. With locking bolt 70 in the retracted unlocked, position of FIG. 5, actuating shaft 78 is free to be rotated 120° in the counterclockwise direction. This rotation of shaft 78 effects counterclockwise rotation of cam disc 86 to move a cam 88, of three spaced cams 88, 90 and 92, against a tail 94 of the fence lever 66 thereby pivoting the latter in the clockwise direction to move fence 64 out of the aligned gates 62 of tumblers 42, 44 and 46 as indicated in FIG. 5. As counterclockwise rotation of cam disc 86 continues, cam 92 moves against a lateral pin 96 carried by locking bolt 70 thereby to return the latter to the right to its locking position as shown in FIG. 7. Counterclockwise movement of cam disc 86 and actuating shaft 78 is limited to 120° by the engagement of a stop pin 98, of three spaced stop pins 98, 100 and 102, with pin 96 carried by bolt 70. Bolt 70 is restrained against inadvertent dislodgement from its retracted and locking positions by means of a detent 104 pivoted about pin 96 into engagement at either side of shaft 78 under the yieldable force of a spring 106.

With the parts in the positions as shown in FIG. 5, the combination lock is unlocked. As described above, when actuating handle 24 and actuating shaft 78 are rotated in the counterclockwise direction, cam 88 first acts against the tail 94 of fence lever 66 to lift fence 64 out of the gates 62 of the three tumblers and then cam 92 acts against pin 96 to move locking bolt 70 rightward to its locking position. By the time bolt 70 reaches its locking position, cam 88 acting against tail 94 will have permitted the nose 80 of fence lever 66 to move downwardly into engagement with the peripheral surface of drive wheel 32 at a point forward (in the clockwise direction as viewed in this figure) of the end of projection 82. With the parts in this position, fence 64 will be correspondingly misaligned with the gates 62 in the three tumblers. If, then, dial 22 is merely rotated in the counterclockwise direction, projection 82 of drive wheel 32 will not re-engage nose 80 of fence lever 66 to retract bolt 70 to its unlocked position because fence 64 will rest or ride on the outer periphery of one or more of the tumblers thereby holding nose 80 in elevated position out of the path of projection 82. It will be apparent, then, that once the combination lock is relocked by the operation of actuating handle 24, the lock cannot be unlocked merely by rotating the dial 22 in the counterclockwise direction. Rather, the combination lock can be unlocked, after being locked, only by again operating the dial according to the correct combination.

Figure 17:
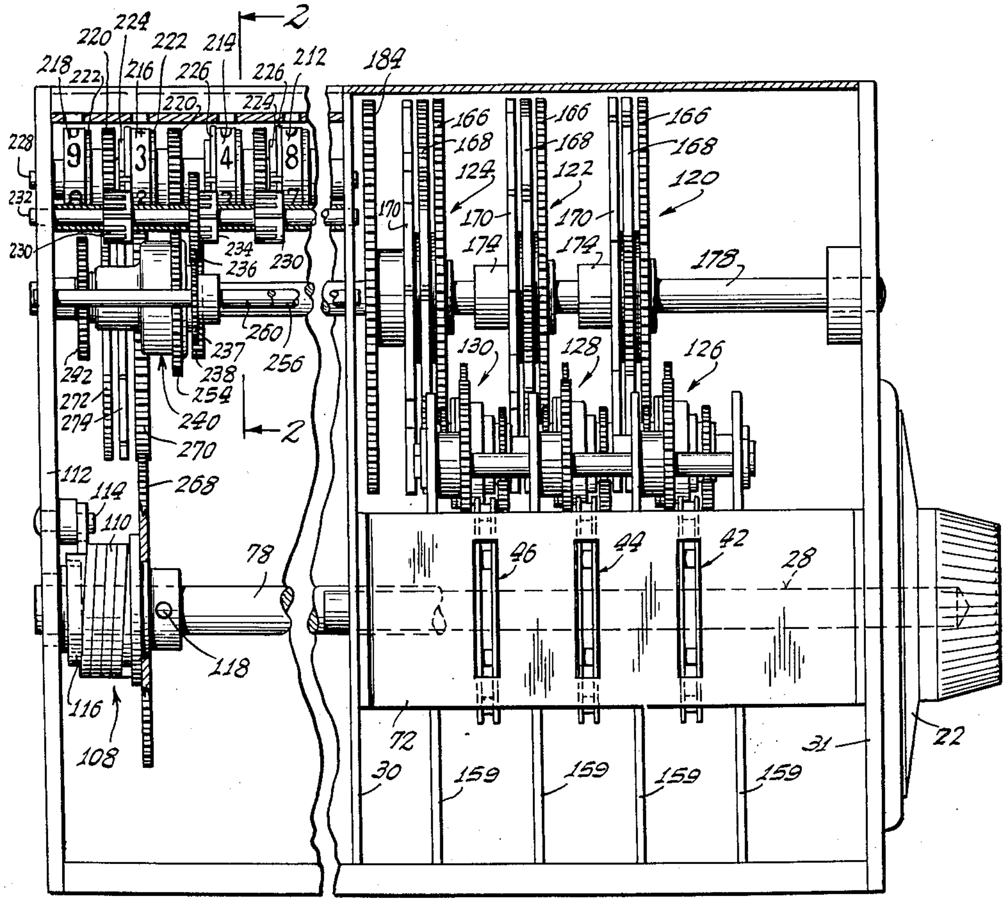
FIG. 17 is a side elevational view showing operating parts of the metering machine, certain of the parts being omitted for clarity of illustration.

It will be noted that actuating shaft 78 is constantly prevented from rotating in the clockwise direction by means of a conventional anti-reverse device generally designated at 108 in FIG. 17. Anti-reverse device 108 comprises a helical spring 110 having one end fixed to end wall 112 of the casing by means of a pin 114. From its fixed end, spring 110 extends in the clockwise direction (as viewed in FIG. 8) with a snug frictional fit about a hub 116 which is fixed to shaft 78 by a pin 118. The frictional fit of spring 110 about hub 116 prevents clockwise rotation of the hub and shaft 78 whereas counterclockwise urging of shaft 78 acts to open the turns of spring 110 about the hub permitting counterclockwise rotation of this shaft.

From the above, it will be seen that when locking bolt 70 is in the rightward, locking position as shown in FIG. 7, counterclockwise rotation of handle 24 to operate actuating shaft 78 is prevented by the engagement of one of stop pins 98, 100, 102 with the pin 96 carried by the bolt. When bolt 70 is retracted to the leftward, unlocked position as shown in FIG. 5, handle 24 and actuating shaft 78 are free for the above-described counterclockwise rotation of 120°; after which rotation, the next succeeding one of stop pins 98, 100, 102 engages pin 96 thereby again preventing operation of handle 24 and actuating shaft 78 until the combination lock is again unlocked by retracting bolt 70.

As noted above, so long as the inner hub member 48 remains fixed relative to the outer annular disc member 50 of each of the tumblers, the correct combination for opening the combination lock remains unchanged. In their conventional form, each tumbler of the type shown in the drawing, is provided with means for securing the hub member 48 and disc member 50 thereof together once the combination lock has been set for a particular correct combination. This securing means is eliminated from each of the tumblers 42, 44 and 46 so that, except for means external to each of these tumblers, the respective hub member 48 and disc member 50 are freely rotatable relative to each other. When relative rotation between the hub member 48 and disc member 50 does occur, the correct combination is altered accordingly.

The means whereby the correct combination of the lock is altered according to a predetermined random pattern each time handle 24 is operated, will now be described. This means includes a differential unit for driving the hub member 48 and disc member 50 of each of the respective tumblers relative to each other, a variable-output mechanism for driving each of the differential units, and a common actuator for driving all of the variable-output mechanisms. Referring particularly to FIG. 17, actuating shaft 78 is the common actuator for driving all three of the variable-output mechanisms generally designated at 120, 122 and 124, respectively. Still referring to FIG. 17, the differential unit generally designated at 126 drives the hub member and disc member of tumbler 42 relative to each other and is driven by variable-output mechanism 120; the differential unit generally designated at 128 drives the hub and disc members of tumbler 44 relative to each other and is driven by the variable output mechanism 122; and the differential unit generally designated at 130 drives the hub and disc member of tumbler 46 relative to each other and is driven by the variable-output mechanism 124.

Differential units 126, 128 and 130 are identical with each other. Referring to FIG. 11, each of these differential units comprises two gears 132 and 134, two idler gears 133 and 135, and a differential gear sub-assembly generally designated by the reference numeral 136. The differential sub-assemblies 136 are of a conventional type (as evidenced, for example, by U.S. Patent No. 1,281,163, granted October 8, 1918, to M. C. Hopkins et al.) and therefore need not be particularly described. Briefly, each differential gear sub-assembly comprises two exterior gears 138 and 140, each of which fixedly carries an interior sun gear 142 and 144, respectively. A two-part shell 146 is force fit together and rotatably mounts gears 138, 142 at one side and gears 140, 144 at the other side. Each of the two parts of shell 146 also provides bearings for two intermeshed planetary gears 148, 150. Planetary gear 148 also meshes with sun gear 142 and planetary gear 150 also meshes with sun gear 144. One of the two parts of shell 146 has an integral, radially extending portion which forms a third exterior gear 152. For convenience in distinguishing therebetween, exterior gears 138 and 140 will, at times, be referred to hereinafter as side gears and exterior gear 152 will hereinafter be referred to as an intermediate gear. Each of side gears 138, 140 has twenty-five teeth, each of sun gears 142, 144 has fifteen teeth, each of planetary gears 148, 150 has twelve teeth and each intermediate gear 152 has fifty teeth.

Figure 9:
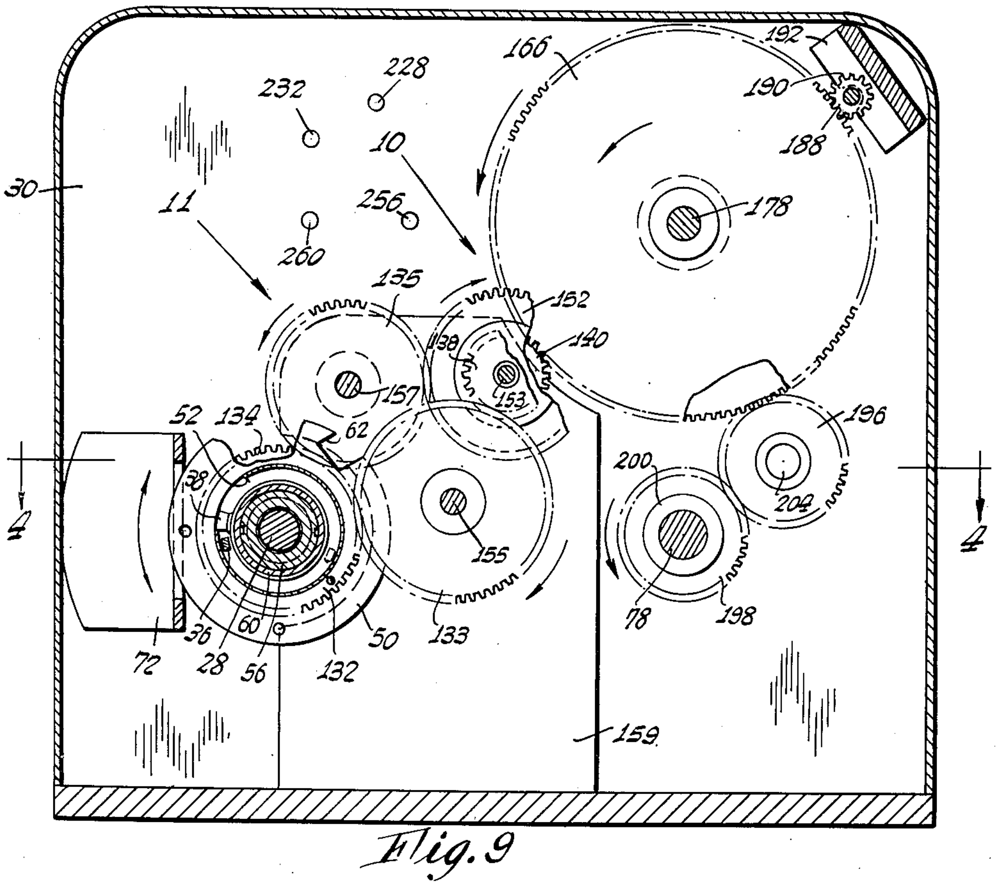
FIG. 9 is a front elevational, sectional view showing a portion of the combination lock and means for altering the correct combination according to a predetermined random pattern.
Figure 10:
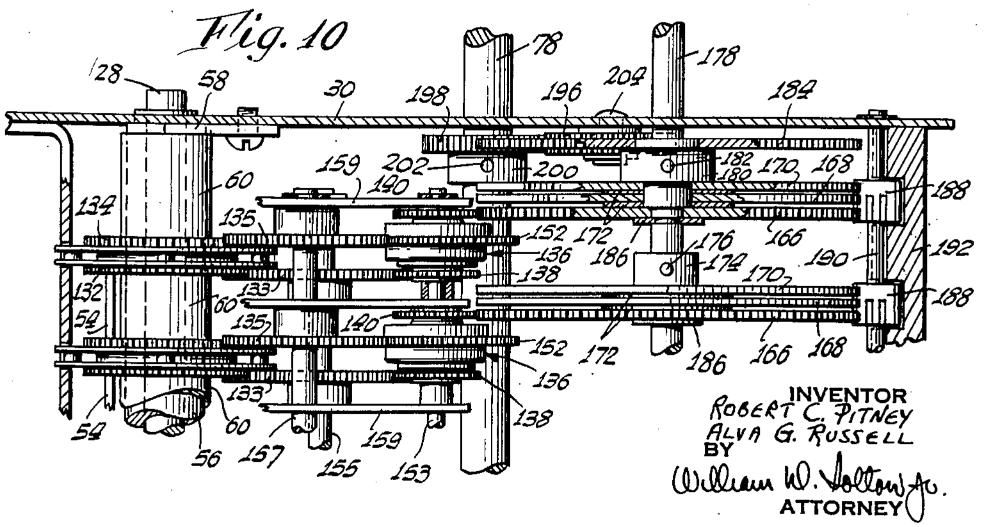
FIG. 10 is a fragmentary view taken in the direction of arrow 10 in FIG. 9.

As best shown in FIGS. 9–11, each idler gear 133 meshes with and drivingly interconnects a gear 132 and a side gear 138, and each idler gear 135 meshes with and drivingly interconnects a gear 134 and an intermediate gear 152. Each gear 132 is fixed, by means such as rivets 154, to the disc member 50 of the associated one of tumblers 42, 44 and 46. In similar fashion each gear 134 is fixed, by means such as rivets 156, to the hub member 48 of the associated one of the tumblers. All of gears 132 and 134 are of the same size, all have fifty teeth and all are concentric with each other and with the tumbler members to which they are fixed. Each of idler gears 133 has sixty teeth and each of idler gears 135 has fifty teeth.

The differential units 136 are supported on a common shaft 153, idler gears 133 are supported for rotation about a common shaft 155, and idler gears 135 are supported for rotation about a common shaft 157. Shafts 153, 155 and 157 are mounted on four spaced standards 159 fixed to the base of the metering machine as shown in FIGS. 9–11 and 17.

It is characteristic of conventional-type differential sub-assemblies 136 that the amount any one of gears 138, 140 and 152 rotates for a given amount of rotation of one of the other two is determined by the amount the remaining one is rotated. More specifically, the relationship is that one-half of the algebraic sum of the amounts of rotation of side gears 138 and 140 always equals the amount of rotation of intermediate gear 152, taking either direction of rotation as positive and the other direction of rotation as negative. It follows that if the side gear 140 (of each differential sub-assembly 136) is held stationary, any amount of rotation of the side gear 138 in either direction will be accompanied by one-half that amount of rotation of the intermediate gear in the same direction. Since the intermediate gear 152 has twice the number of teeth that the side gear 138 has (each intermediate gear has fifty teeth and each side gear 138 has twenty five teeth), these two gears will have the same number of teeth move in the same direction past a given point on their respective pitch circles so long as side gear 140 is held stationary. It follows that each pair of gears 132, 134 (which both have fifty teeth and which will hereinafter be referred to as slave gears) will be freely rotatable but will be prevented from rotating relative to each other so long as the side gear 140 (which will hereinafter be referred to as a master gear) of the respective one of differential units 126, 128 and 130 is held stationary. The hub member 48 and disc member 50 of each of tumblers 42, 44 and 46 being drivingly connected to slave gears 134 and 132, respectively, of the associated one of differential units 126, 128 and 130, the respective hub and disc members of each of the tumblers will likewise be freely rotatable but not relative to each other while the respective master gear 140 is held stationary. Consequently, so long as the master gears 140 of all of the differential units 126, 128 and 130 are held stationary, the dial 22 can be operated to enter the correct combination into the combination lock (because the tumblers are freely rotatable) and this correct combination will remain unchanged (because the respective hub and disc members of all of the tumblers remain fixed, each with respect to the other).

It also follows from the above-noted relationship among the respective amounts of rotation of gears 138, 140 and 152 of each differential sub-assembly that any rotation of the master gear 140 will affect the amount that either one of side gear 138 or intermediate gear 152 will rotate with a given amount of rotation of the other. For example, intermediate gear 152 rotates one full clockwise revolution with two full clockwise revolutions of side gear 138 (resulting in no relative rotation between the slave gears 132 and 134 of that respective differential unit) when master gear 140 is held stationary. On the other hand, if master gear 140 is rotated one full clockwise revolution instead of being held stationary, intermediate gear 152 will rotate one and one-half clockwise revolutions with the same two full clockwise revolutions of side gear 138 (resulting in one-half a clockwise revolution of the slave gear 134 relative to the slave gear 132 of that respective differential unit). It follows that, instead of the freely rotatable slave gears 132, 134 of each differential unit being confined against rotation relative to each other as they are when the associated master gear 140 is held stationary, these freely rotatable slave gears will be rotated relative to each other when the associated master gear 140 is rotated; the amount of this relative rotation being proportional to the amount the master gear is rotated. The hub member 48 and disc member 50 of each of tumblers 42, 44 and 46 being drivingly connected to a slave gear 134 and 132, respectively, the respective hub and disc members of each tumbler will be rotated relative to each other when the master gear 140 of the associated differential unit is rotated, and the amount of this relative rotation will be proportional to the amount that master gear is rotated. Consequently, when any one or more of the respective master gears 140 of the differential units 126, 128 and 130 are rotated, the correct combination for unlocking the combination lock will be altered correspondingly.

The amount that each master gear 140 will be rotated each time actuating shaft 78 is rotated 120° in the clockwise direction, is determined by the respective one of variable-output mechanisms 120, 122 and 124 which drivingly connects the particular master gear 140 with common actuating shaft 78. All three of these variable-output mechanisms are identical with each other except for variable arrangements of gear teeth, all as will become clear as the description proceeds.

Referring to FIGS. 9, 10, 12–14 and 16, each of the variable-output mechanisms includes a full-tooth gear 166 having one hundred twenty teeth, a mutilated gear 168 and a locking wheel 170. An annular spacer 172 is disposed between the gears 166 and 168 and between the gear 168 and the locking wheel 170 of each variable-output mechanism. The mutilated gear 168, the locking wheel 170 and the two spacers 172, 172 of each of the variable-output mechanisms 120 and 122 are brazed onto a respective hub 174, each of the latter being pinned at 176 to a shaft 178. The mutilated gear 168, the locking wheel 170 and the two spacers 172, 172 of variable-output mechanism 124 are likewise brazed onto a hub 180, the latter being pinned at 182 to shaft 178. Hub 180 also has a full-tooth gear 184 brazed thereto, this latter gear having one hundred twenty teeth. Shaft 178 is rotatably supported by front wall 31, intermediate wall 30 and rear wall 112 of the casing of the metering machine. It will be apparent from the above that the mutilated gear 168 an locking wheel 170 of all of the variable output mechanisms 120, 122 and 124 are rotatable with gear 184 and shaft 178. Each of the full tooth gears 166 is rotatable about shaft 178 and is retained in place against the end of the respective one of hubs 174, 174, 180 by means of a spring washer 186 seated in a groove about shaft 178.

Each variable-output mechanism further includes a conventional type, twelve tooth Geneva pinion 188. Geneva pinions 188 are rotatable about a common shaft 190, the latter being supported at its opposite ends by intermediate wall 30 and front wall 31. Shaft 190 is reinforced along its length by a reinforcing bar 192 having transverse slots within each of which, one of Geneva pinions 188 is retained against displacement along this shaft.

Figures 12, 13, 14:
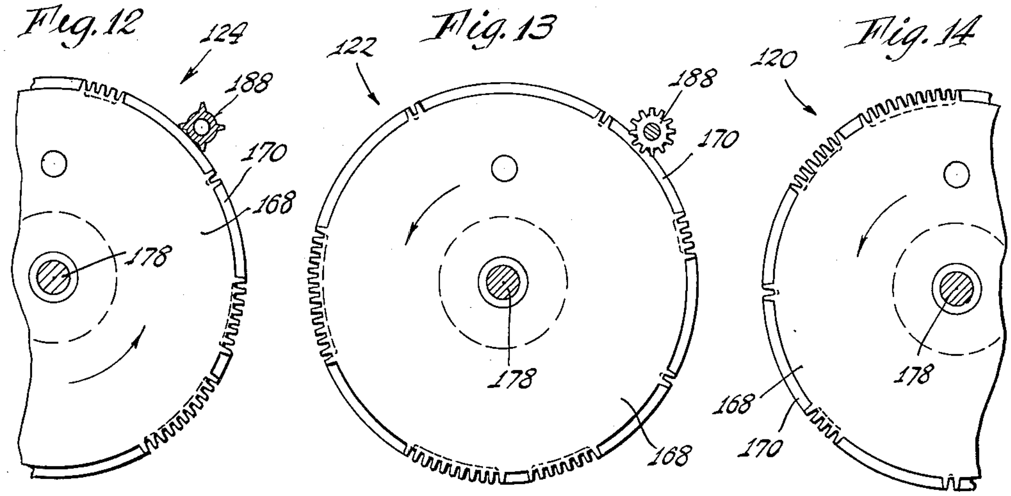
FIGS. 12, 13 and 14 are respective side elevational views of the multilated gear and locking wheel of the three respective variable-output mechanisms which are drivably connected to the three differential units of the metering machine.

Four of the twelve teeth of each Geneva pinion 188 extend the full width of that Geneva pinion and are equally spaced about the periphery thereof as best shown in FIG. 10 and by the section of the Geneva pinion 188 as shown in FIG. 12. The extended portions of these four teeth of each Geneva pinion 188 cooperate with the locking wheel to lock the Geneva pinion at any one of four rotational positions in a manner well known to those skilled in the art of motion-translating mechanisms. Since a single tooth on one of the mutilated gears will drive its associated Geneva pinion two teeth and since each additional tooth on the mutilated gear will drive the Geneva pinion one additional tooth, the number of teeth in each group of successive teeth about the periphery of each of the mutilated gears will be one less than a multiple of three. As indicated above, each locking wheel 170 will lock its associated Geneva pinion in any one of the four rotational positions it assumes before and after each group of successive teeth on the next adjacent mutilated gear move past that Geneva pinion.

The groups of successive teeth, with blank spaces between the groups, are arranged in a predetermined random pattern about the periphery of each respective mutilated gear as shown in FIGS. 12, 13 and 14. For each one tooth movement of gear 184, each one of the three mutilated gears will drive its respective Geneva pinion one tooth or no teeth depending upon the respective random pattern of teeth of that mutilated gear.

Full tooth gear 184, which is fixed to shaft 178 as are the mutilated gear 168 and locking wheel 170 of all of the variable-output mechanisms 120, 122 and 124, is in mesh with a full tooth idler gear 196. Idler gear 196 is in mesh with a full tooth gear 198, the latter being integral with a hub 200 which is pinned at 202 to actuating shaft 78 as best shown in FIGS. 9 and 10. Idler gear 196 is rotatable about a stub shaft 204 carried by intermediate wall 30. Gear 198 has thirty-nine teeth, as does idler gear 196.

When handle 24 and actuating shaft 78 are rotated 120° in the counterclockwise direction as viewed in FIG. 8 (after the combination lock is unlocked), gear 198 is rotated thirteen teeth to rotate idler gear 196 and gear 184 thirteen teeth. This causes the mutilated gear 168 of all three variable-output mechanisms 120, 122 and 124 to rotate thirteen teeth so that each of the mutilated gears will drive its respective Geneva pinion 188 any number of teeth from and including zero through and including thirteen, depending upon the predetermined random pattern of the teeth about the periphery of the respective mutilated gears. Each Geneva pinion 188 will drive the full tooth gear 166 with which it meshes, the same number of teeth in the counterclockwise direction as that which it is driven in the clockwise direction. Taking the case of a Geneva pinion 188 being rotated one tooth, the associated full tooth gear 166 will be rotated one tooth as will be respective master gear 140 of the associated one of differential units 126, 128 and 130. This results in one tooth of relative movement between the hub member 48 and disc member 50 of the associated tumbler. Since dial 22 is marked off into one hundred evenly spaced graduations as indicated in FIG. 8, this one tooth of relative movement will alter the correct combination by two graduations on the dial 22. Accordingly, each one tooth movement of the Geneva pinion 188 of each of the three variable-output mechanisms 120, 122, 124, causes a change of two digits in one of the three numbers of the correct combination of the combination lock.

It will be noted that when any one of master gears 140 is rotated to rotate the hub and disc members of the associated tumbler relative to each other, this relative rotation may come about in any one of the following ways: only the hub member will rotate, only the disc member will rotate, or both the hub and the disc member will rotate. Which one of these that occurs depends, to a large extent, on the vagaries of each individual differential unit and tumbler set; but the end result, so far as altering the correct combination is concerned, will be the same in any case. This is so because it is the position of the hub and disc members relative to each other that governs what the correct combination will be; the hub and disc members being otherwise freely rotatable as a unit to permit alignment of the gates 62 of all the tumblers when dial 22 is operated according to the correct combination. It will be noted that each time handle 24 is operated by rotating it 120° in the counterclockwise direction, several degrees of this rotation are required to effect movement of fence 64 out of the gates 62 of all three of tumblers 42, 44 and 46. If, as will often be the case, one or more of the mutilated gears 168 is driving its associated Geneva pinion 188 during this initial several degrees of rotation, the disc member of the associated one of the tumblers will be restrained by the fence 64 against rotation. In this case, it will be only the hub member of that tumbler that will be rotated, at least until the fence 64 moves clear of the gates 62 as provided by the disc members of the tumblers.

The manner in which the correct combination is altered according to a predetermined random pattern will become apparent from the following example. Let it be assumed that, initially, the correct combination is 35–3–40. This means that in unlocking the combination lock, the dial is turned in the clockwise direction (as viewed in FIGS. 8 and 9) at least three full revolutions plus the amount necessary to bring the dial to the number 35, then in the counterclockwise direction two full revolutions plus the amount necessary to bring the dial to the number 3, then one full clockwise revolution plus the amount necessary to bring the dial to the number 40, and then in the counterclockwise direction to retract the locking bolt 70. Let it further be assumed that the mutilated gears 168 of the three variable-output mechanisms 120, 122 and 124 drive their associated Geneva pinions four, eleven and thirteen teeth, respectively, when handle 24 is rotated 120° in the counterclockwise direction after the above-noted, initial, correct combination was entered into the combination lock. Each number of the new correct combination is obtained by multiplying two times the number of teeth the respective Geneva pinion 188 is driven (the slave gears 132, 134 move relative to each other the same number of teeth as the associated Geneva pinion moves, and each tooth of this relative movement equals two graduations on dial 22) and subtracting the result from the corresponding number of the immediately preceding correct combination. In this case, 13 (which is the number of teeth the Geneva pinion 188 of variable-output mechanism 124 is driven) multiplied by 2 equals 26, and 35 (which is the first number of the immediately preceding correct combination, the first number of the correct combination being determined by the tumbler associated with variable-output mechanism 124) minus 26 yields 9 as the first number of the new correct combination; 11 multiplied by 2 equals 22, 3 minus 22 equals minus 19 and (since dial 22 has one hundred graduations) minus 19 plus 100 yields 81 as the second number of the new correct combination; and 4 mutiplied by 2 equals 8, and 40 minus 8 yields 32 as the third number of the new correct combination. The correct combination will, therefore, have been altered from 35–3–40 to 9–81–32.

It will be apparent from the above example that the random pattern by which the correct combination is altered each time handle 24 is operated, is predetermined according to the individual random pattern of the teeth about the periphery of the mutilated gear 168 of each of the variable-output mechanisms 120, 122 and 124 and also according to the rotational position of the mutilated gear of each of the variable-output mechanisms. Each mutilated gear 168 occupies any one of one hundred twenty different rotational positions, this being the case because each of these gears is fixed for rotation with full tooth gear 184 and the latter occupies any one of one hundred twenty different rotational positions. If all three of the mutilated gears 168 are identical with each other, they can be set in $(120)^3$ or 1,728,000 different combinations of relative rotational positions. Accordingly, 1,728,000 different predetermined random patterns by which the correct combination is altered, can be provided using only one pattern for the arrangement of the groups of successive teeth about the periphery of the mutilated gears. By using additional patterns for the arrangement of the teeth about the periphery of the respective mutilated gears, the number of different predetermined random patterns by which the correct combination is capable of being altered, is greatly increased.

It will be apparent that when handle 24 and actuating shaft 78 are locked by the combination lock against rotation in the counterclockwise direction, the master gear 140 of all three of differential units 126, 128 and 130 will be locked against rotation either because the associated Geneva gear 188 is locked by its locking wheel 170 or, in the situation when one or two teeth of its mutilated gear 168 are in mesh with that Geneva gear, the latter is locked, not by its locking wheel 170, but rather by the actuating shaft 78. Accordingly, the hub member and disc member of each of tumblers 42, 44 and 46 remain fixed relative to each other, and the combination remains unaltered, so long as handle 24 and actuating shaft 78 remain locked.

Each time actuating handle 24 is operated by rotating it 120°, the respective mutilated gear 168 of each of the variable-output mechanisms 120, 122 and 124, is rotated 13/120 of a revolution. It follows that the respective rotational position occupied by each mutilated gear 168 at any given time between successive operations of handle 24 will not again be duplicated between successive operations of handle 24 until the latter has been operated one hundred and twenty times. This being the case, the random pattern by which the correct combination is altered, will not begin repeating itself until the handle 24 has been operated one hundred and twenty times. It will be noted that, even though this random pattern does begin to repeat itself after one hundred and twenty operations of handle 24, the correct combination will not, providing that the total number of teeth about the periphery of each of the three mutilated gears 168 is not fifty or a multiple of fifty. This is so because the correct combination after one hundred and twenty operations of handle 24 will then not be the same as it was before this one hundred and twenty operations.

The manner in which the register 26 is reset to a new value each time handle 24 is operated, will now be described. As shown in FIG. 1, the metering machine has two setting levers 210, each of which can be set to any one of ten positions from zero through nine.

Depending on the setting of these levers 210, the value indicated by the register will be decreased any amount from zero through ninety nine units each time the metering machine is operated. By way of example, if a stamp impression having a value of sixty two units is to be metered by the metering machine, the appropriate one of setting levers 210 is set at six and the other at two. Subsequently and during the operating cycle of the metering machine, the latter will meter the value of the stamp impression and the two counter wheels of lowest denominational order will be rotated six and two units, respectively, in the decreasing or descending direction. The mechanism by which the impression is printed and by which the value indicated by the register is so decreased is well known in the art and therefore need not be described herein.

Figure 16:
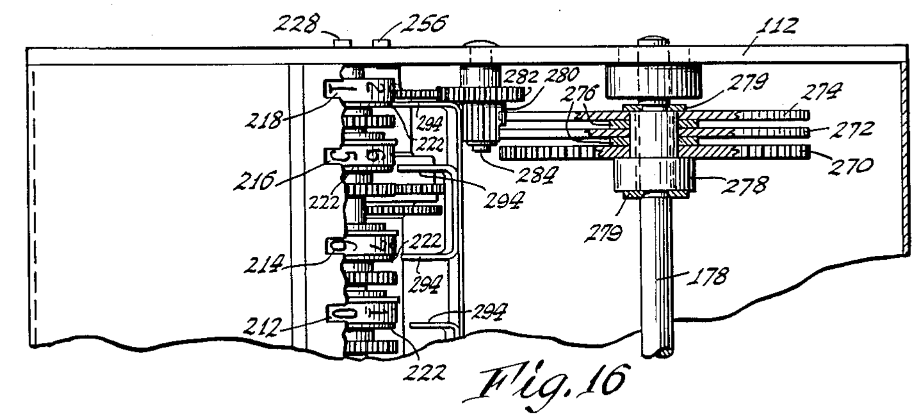
FIG. 16 is a fragmentary top plan view showing the register and a portion of the means for resetting the register.

The portion of the register which indicates the four digits of highest denominational order comprises four counter wheels 212, 214, 216 and 218, respectively, as shown in FIGS. 1, 16 and 17. Each of counter wheels 212, 214, 216 and 218 bears indicia from zero through nine about its periphery and each fixedly carries a full tooth gear 220 and a lock-out wheel 222 at one side. Each of counter wheels 212, 214 and 216 fixedly carries a two tooth mutilated gear 224 and a locking wheel 226 at its other side. Counter wheels 212, 214, 216 and 218 are mounted on a common shaft 228 for rotation independently of each other. A Geneva pinion 230 drivingly interconnects the mutilated gear 224 fixed to counter wheel 212 with the full tooth gear 220 fixed to counter wheel 214. Another Geneva pinion 230 interconnects the mutilated gear 224 fixed to counter wheel 216 with the full tooth gear 220 fixed to counter wheel 218 in the same manner. Both of Geneva pinions 230 are rotatably mounted on a common shaft 232 and each cooperates with the gears they interconnect in the same manner that the Geneva pinions 188 of variable-output mechanisms 120, 122 and 124 cooperate with the gears they interconnect as described above. Shafts 228 and 232 are supported by end wall 112 and intermediate wall 30 of the casing. Each full tooth gear 220 has thirty teeth and each Geneva pinion 230 has fifteen teeth with five equally spaced extended teeth. The two teeth of each mutilated gear 224 are so located relative to the indicia on the counter wheel to which it is fixed that when the latter moves from its zero to its nine position, its two teeth drive the respective Geneva pinion three teeth. The rim of each locking wheel 226 cooperates with two of the five extended teeth of its associated mutilated gear 224, the associated full tooth ge the five rotational positions assumed thereby. When the respective Geneva pinion is driven three teeth by its associated mutilated gear 224, the associated full tooth gear 220 will likewise be driven three teeth. Each full tooth gear 220 having thirty teeth, it will be driven one-tenth of a revolution whereby one digit is transferred or borrowed from the respective counter wheel to which that full tooth gear is fixed.

The structure and function of that portion of register 26 which includes counter wheels 212, 214, 216 and 218 is, to the extent described above, well known and conventional. Each counter wheel, which is connected with the respective counter wheel of next lower order by a Geneva pinion 230 according to this conventional arrangement, is locked against rotation by the locking wheel 226 carried by the counter wheel of next lower order (except, of course, when the respective counter wheel of next lower order is moving from its 0 to 9 position, in which case the latter drives the counter wheel of next higher order one digit space). Ordinarily, therefore, none of the counter wheels according to this conventional arrangement, except the one of lowest order, can be rotated to reset the register to a higher value, without in some way unlocking or otherwise releasing one or more of the Geneva pinions. Register 26 departs from this conventional arrangement in the means by which one digit is transferred or borrowed from counter wheel 216 when the counter wheel 214 of next lower order rotates from its 0 to 9 position; this means also providing, in part, for resetting of the register to an increased value without unlocking or otherwise releasing any of the Geneva pinions. This means includes a modified Geneva pinion 234 which is mounted for rotation about shaft 232 and which is otherwise identical to Geneva pinions 230, 230 with the exception that Geneva pinion 234 has integral therewith an enlarged full tooth gear 236 in place of the portion of each of Geneva pinions 230 which meshes with a full tooth gear 220. Full tooth gear 236 meshes with an idler gear 237, the latter in turn meshing with a side gear 238 of a differential gear sub-assembly generally designated by the reference numeral 240 in each of FIGS. 2, 3 and 17. Differential sub-assembly 240 is also of a conventional type (as evidenced, for example, by U.S. Patent No. 1,281,163 granted on October 8, 1918, to M. C. Hopkins et al.) and therefore need not be particularly described. Briefly, differential gear sub-assembly 240 includes a side gear 242 in addition to side gear 238. Side gear 238 is integral with a sleeve 239 within which a sleeve 241 is fixed as by brazing. Sleeve 241 is integral with an interior sun gear 244 whereby gears 238 and 244 are fixed relative to each other for rotation as a unit. In similar manner, side gear 242 and an interior sun gear 246 are integral with concentric, relatively fixed sleeves 243 and 245, respectively, whereby gears 242 and 246 rotate as a unit. A two-part shell 248 is force fit together and rotatably mounts gears 238, 244 at one side and gears 242, 246 at the other side. Each of the two parts of shell 248 also provides bearings for two intermeshed planetary gears 250 and 252. Planetary gear 250 also meshes with sun gear 244, and planetary gear 252 also meshes with sun gear 246. One of the two parts of shell 248 has an integral, radially extending portion which forms a third exterior gear 254. Gear 254, in order to distinguish it from side gears 238 and 242, will hereinafter be referred to as the intermediate gear of the differential sub-assembly 240. Each of the side gears 238, 242 has thirty teeth, each of the sun gears 244, 246 has fifteen teeth, each of planetary gears 250, 252 has twelve teeth, and intermediate gear 254 has forty five teeth. It is to be noted that differential gear sub-assembly 240 differs structurally from each of the differential gear sub-assemblies 136 of differential units 126, 128 and 130 as described above, only in the number of teeth each of its exterior gears 238, 242 and 254 has and in the structure whereby these exterior gears are spaced apart respectively different distances. Differential sub-assembly 240 is supported on a shaft 256 which in turn is carried adjacent its end by end wall 112 and intermediate wall 30 of the casing.

As previously described, side gear 238 of differential sub-assembly 240 meshes with the idler gear 237, the latter having twenty teeth and being rotatably mounted by shaft 260 which is supported adjacent its ends by intermediate wall 30 and end wall 112 of the casing. Idler gear 237 also meshes with the gear 236 which is integral with Geneva pinion 234. Intermediate gear 254 of differential sub-assembly 240 meshes with the gear 220 which is fixed to counter wheel 216.

It is characteristic of conventional-type differential sub-assemblies 240 that the amount any one of gears 238, 240 and 254 rotates for a given amount of rotation of one of the other two is determined by the amount the remaining one rotates. More specifically, the relationship is that one-half the algebraic sum of the amounts of rotation of side gears 238 and 240 always equals the amount of rotation of intermediate gear 254, taking either direction of rotation as positive and the other direction of rotation as negative. It follows that if the side gear 242 is held stationary (as it will be except during resetting of the register 26 as will later be described), any amount of rotation of the side gear 238 in either direction will be accompanied by one-half that amount of rotation of the intermediate gear in the same direction.

Figures 2, 3:
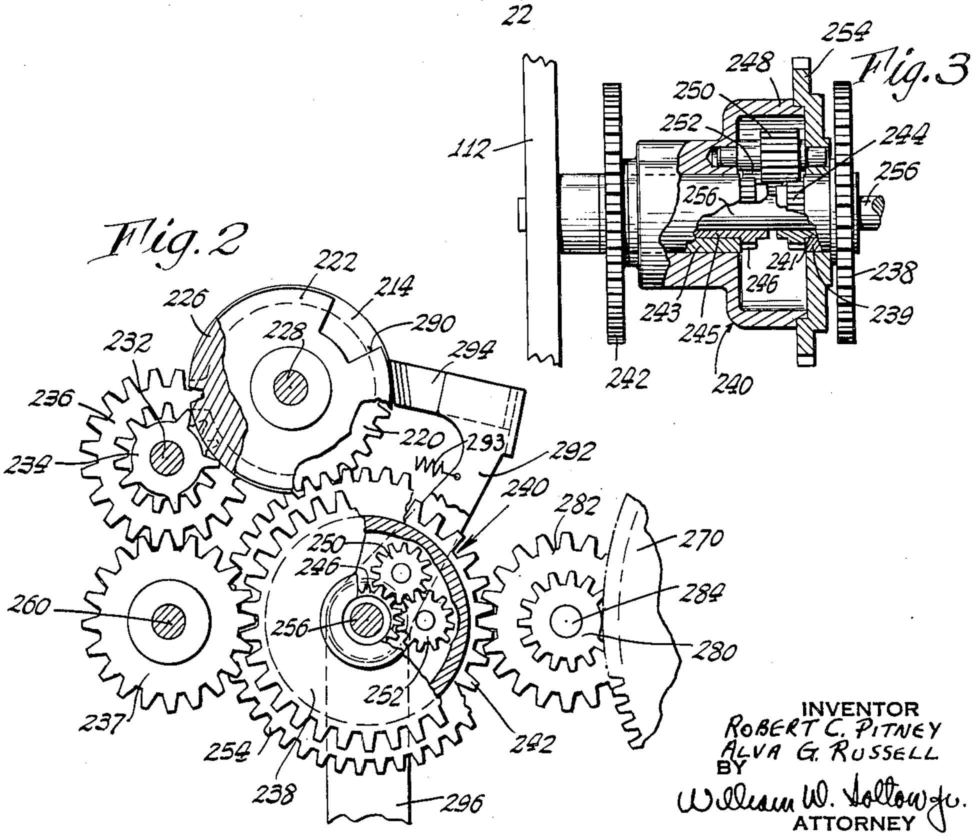
FIG. 2 is a fragmentary sectional view taken along line 2—2 in FIG. 17 and showing a portion of the register mechanism including a differential sub-assembly.
FIG. 3 is a side elevational view, with portions broken away, of the differential sub-assembly of the register mechanism, along with supporting structure therefor.

Geneva gear 234 is driven three teeth in the counterclockwise direction as viewed in FIG. 2, when counter wheel 214 is moved from its 0 to 9 position in the same manner that each of Geneva gears 230, 230 is rotated three teeth when counter wheels 212 and 216 are moved from their 0 to 9 position. Since Geneva pinion 234 has fifteen teeth and since gear 236 is fixed to Geneva pinion 234, both gear 236 and Geneva pinion 234 will be rotated $\frac{3}{15}$ or one-fifth of a counter-clockwise revolution. Since gear 236 has twenty teeth, it will drive idler gear 237 clockwise one-fifth of twenty or four teeth. Idler gear 237, of course, drives side gear 238 the same number or four teeth. Since side gear 238 has thirty teeth, it will rotate $\frac{4}{30}$ or two-fifteenths of a counterclockwise revolution. Since intermediate gear 254 rotates half the amount that side gear 238 rotates and in the same direction that side gear 238 rotates (when side gear 242 is held stationary), intermediate gear 254 will rotate one-fifteenth of a counterclockwise revolution. Since intermediate gear 254 has forty five teeth, it will drive the gear 220 fixed to counter wheel 216 one-fifteeth of forty five or three teeth in the clockwise direction. Since each of gears 220 has thirty teeth, counter wheel 216 will be driven $\frac{3}{30}$ or one-tenth of a revolution in the clockwise direction whereby the transfer of one digit from counter wheel 216 to counter wheel 214 is accomplished. It will be apparent then that, just as each of the counter wheels 214 and 218 is rotated one digit in the descending direction when the respective counter wheel of next lower order rotates from its 0 to 9 position, counter wheel 216 will be rotated one digit in the descending direction when the respective counter wheel of next lower order (namely: counter wheel 214) rotates from its 0 to 9 position.

As noted above, one-half the algebraic sum of the amounts of rotation of side gears 238 and 242 of differential sub-assembly 240, always equals the amount of rotation of intermediate gear 254, taking either direction of rotation as positive and the other as negative. It follows that if the side gear 238 is held stationary (as it is except when a transfer occurs between counter wheels 214 and 216), any amount of rotation of the side gear 242 in either direction will be accompanied by one-half that amount of rotation of the intermediate gear in the same direction. Intermediate gear 254 being in mesh with the gear 220 fixed to counter wheel 216, counter wheel 216 will be driven to reset the register 26 when side gear 242 is driven (while side gear 238 is held stationary). Side gear 242 is driven each time handle 24 is operated, as will hereinafter be described.

Referring to FIGS. 8 and 15–17, hub 116 which is fixed to actuating shaft 78, fixedly carries a gear 268. Gear 268 meshes with a full tooth gear 270, the latter being fixed, along with a locking wheel 272, a mutilated gear 274 and two spacers 276, on a hub 278. Hub 278 is rotatable about shaft 178 and is prevented from undue lateral displacement along this shaft by means of two split washers 279 which are seated in respective grooves about this shaft. Gear 268 has one hundred and eight teeth and gear 270 has one hundred and eight teeth. Mutilated gear 274 has three groups of teeth about its periphery; there being fourteen teeth in each group and a dwell space between the groups. When actuating shaft 78 is operated by rotating it 120° in the counterclockwise direction as viewed in FIG. 8, gear 268 will be rotated counterclockwise 120° which is one-third of one hundred and eight or thirty six teeth. Gear 270, along with mutilated gear 274 and locking wheel 272, is thereby driven $\frac{36}{108}$ or one-third of a revolution in the clockwise direction. Each time mutilated gear 274 is rotated one-third of a revolution, one of its groups of teeth is moved in mesh past a Geneva pinion 280 having fifteen teeth. Geneva pinion 280 will be rotated one tooth more than the number of teeth in each group on mutilated gear 274, whereby the Geneva pinion is rotated fifteen teeth or one full revolution in the counterclockwise direction. Geneva pinion 280 is integral with a gear 282 having twenty teeth. Geneva pinion 280 and gear 282 are rotatably supported by a stub shaft 284 carried at one end by end wall 112 of the casing. Locking wheel 272, in cooperation with two extended teeth of Geneva pinion 280, locks the latter and gear 282 against rotation before and after each of the groups of teeth on mutilated gear 274 move in mesh past the Geneva pinion 280. Gear 282 is in mesh with side gear 242 of differential sub-assembly 240. Since gear 282 has twenty teeth, each full counterclockwise rotation thereof drives side gear 242 twenty teeth in the clockwise direction (as viewed in each of FIGS. 8 and 15).

Figure 15:
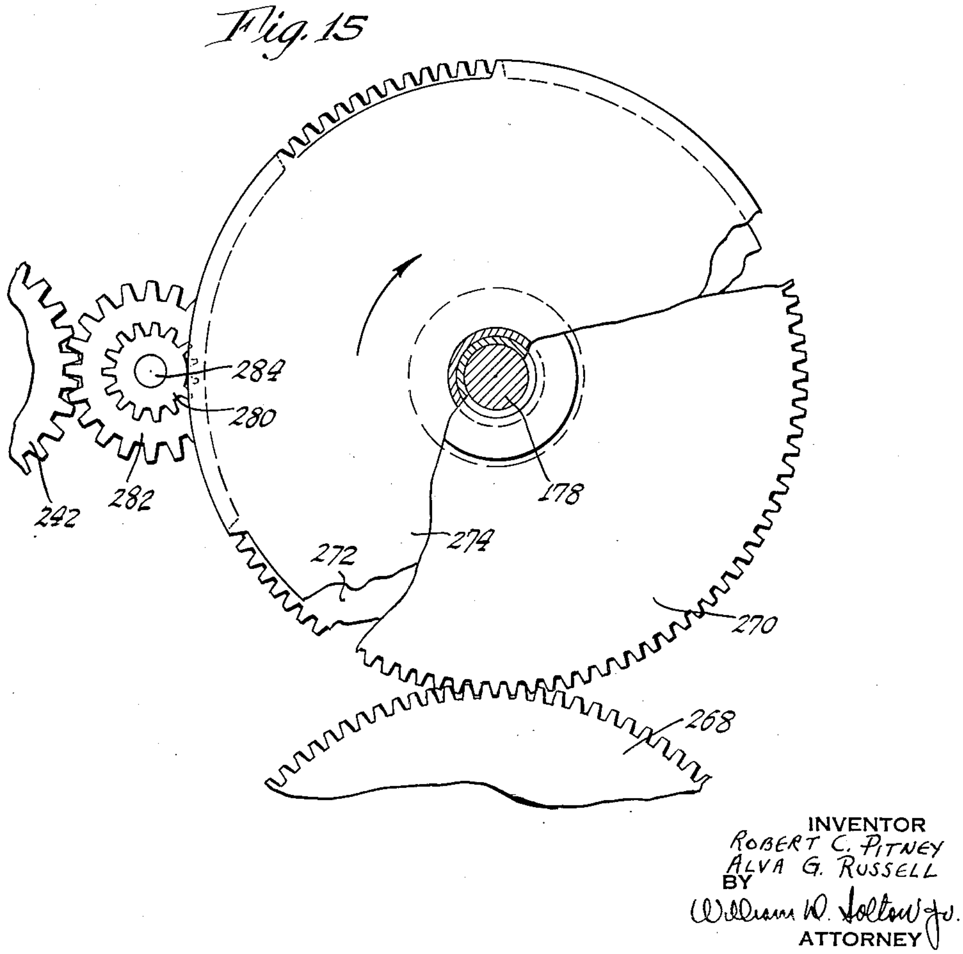
FIG. 15 is a fragmentary side elevational view of a portion of the gearing for resetting the register of the metering machine.

Since side gear 242 of differential sub-assembly 240 has thirty teeth, this side gear will be rotated $\frac{20}{30}$ or two thirds of a full clockwise revolution as viewed in FIGS. 8 and 15. Since, as noted above, any amount of rotation of side gear 242 of differential sub-assembly 240 is accompanied by one-half that amount of rotation of the intermediate gear 254 in the same direction so long as side gear 238 is held stationary, intermediate gear 254 will be rotated one-third of a full clockwise revolution. Since intermediate gear 254 has forty five teeth and is in mesh with the full tooth gear 220 fixed to counter wheel 216, this full tooth gear is driven $\frac{45}{3}$ or fifteen teeth in the counterclockwise direction. Since each digit on counter wheel 216 is equivalent to three teeth of the full tooth gear 220 fixed thereto, counter wheel 216 will be rotated five digits in the counterclockwise (ascending) direction.

It will be clear from the above, therefore, that each time handle 24 and actuating shaft 78 are operated, the value indicated by the register 26 will be increased by five digits in the second highest order. Where, as shown in FIG. 1, the second highest order represents the ten thousands order, the value indicated by the register will be increased by fifty thousand units. It will be recognized that the selection of the counter wheel of second highest order to be reset each time handle 24 is operated, is arbitrary, and that any of the counter wheels of register 26 can be operatively connected in similar manner to be driven any convenient number of digits.

Side gear 238 of differential sub-assembly 240 is held stationary except when a transfer or borrow of one digit is being effected from counter wheel 216 to counter wheel 214; this being the case because side gear 238 can rotate only when Geneva pinion 234 rotates, and the latter is locked by the locking wheel 226 fixed to counter wheel 214 except when the above-noted transfer is being effected. Side gear 242 of differential sub-assembly 240 is held stationary except when actuating handle 24 is being operated; this being so because side gear 242 can rotate only when handle 24 is rotated, and the latter is locked, along with actuating shaft 78, by anti-reverse device 108 and locking bolt 70 except when bolt 70 is retracted to unlocked position after the correct combination is entered into the combination lock.

Resetting of the register 26 by rotatably driving side gear 242 of differential sub-assembly 240 has been described above as occurring while side gear 238 remains stationary, and the transfer of a digit from counter wheel 216 to counter wheel 214 by rotatably driving side gear 238 of differential sub-assembly 240 has been described above as occurring while side gear 242 remains stationary. These situations will, of course, hold true so long as no attempt is made to reset the register during a metering cycle of the metering machine 20. If, however, the register should be reset while a transfer is occurring from counter wheel 216 to counter wheel 214 (during a metering cycle), the effect of the two will be cumulative. That is, whereas counter wheel 216 is rotated five digit spaces in the ascending direction when the register is reset and whereas counter wheel 216 is rotated one digit space in the descending direction when a transfer occurs from counter wheel 216 to counter wheel 214, the result, when both occur at the same time, will be rotation of counter wheel 216 four digit spaces in the ascending direction.

It will be clear from the above that differential sub-assembly 240 acts, in itself, as a differential unit for effecting transfers from counter wheel 216 to counter wheel 214 and for effecting resetting of the register 26.

The manner in which the metering machine 20 becomes locked out against further operation when the amount or value indicated by the register 26 is below a predetermined minimum will now be described. This predetermined minimum value is one unit greater than the maximum amount to which the setting levers 210 can be set. Setting levers 210 being associated with the two counter wheels of lowest order in register 26, the maximum value to which these levers can be set is ninety nine units. Accordingly, this predetermined minimum value is one hundred units.

Referring to FIGS. 2, 8, 16 and 17, each of the counter wheels 212, 214, 216 and 218 has a lock-out wheel 222 fixed thereto as previously described. Each lock-out wheel 222 has a radial slot 290 therein which opens to the periphery thereof. Shaft 256, which mounts differential sub-assembly 240, also pivotally mounts a U-shaped lever 292. Lever 292 is yieldingly urged in the counter-clockwise direction about shaft 256 by a spring 293. Lever 292 carries four locking dogs 294, each of which is in alignment with the lock-out wheel 222 fixed to one of counter wheels 212, 214, 216 and 218. As best shown in FIGS. 2 and 16, the locking dog 294 aligned with the lock-out wheel 222 carried by counter wheel 218 of the highest denominational order, is of greater length than each of the remaining locking dogs; the lower the order, the shorter being the length of the associated locking dog 294. When all four of register wheels 212, 214, 216 and 218 indicate values other than zero, the locking dog 294 aligned with the lock-out wheel 222 of the highest order rides on the periphery of that locking wheel and the remaining locking dogs are spaced from the periphery of their respective lock-out wheels. When the value indicated by register wheel 218 descends to zero, the slot 290 in the lock-out wheel fixed to that counter wheel, moves into alignment with the locking dog 294 of that order and that dog 294 enters that slot 290. The locking dog 294 of the next lower order then rides on the periphery of its lock-out wheel 222 until the respective counter wheel 216 of that next lower order descends to zero, at which time that locking dog enters that slot. This continues until all four locking dogs 294 enter the slots of their respective lock-out wheels 222, it being noted that no locking dog 294 can enter the slot in its respective lock-out wheel 222 until this has occurred to all of the locking dogs 294 of higher order. Accordingly, the minimum value at which at least one of locking dogs 294 has not entered the slot in its counter wheel will be one hundred units; this being the smallest value at which only the locking dog 294 associated with register wheel 212 has not entered the slot in its locking wheel. When all four of locking dogs 294 have entered the slots in their respective lock-out wheel 222, a tail 296 integral with lever 292 will have been swung in a counterclockwise direction to the broken line position, as viewed in FIG. 2. The latter will effect operation of mechanism (not shown) for preventing further metering by the metering machine. One example of mechanism for preventing further metering will be found in U.S. Patent No. 2,141,119 granted on December 20, 1938, to W. H. Wheeler, Jr., et al., wherein counter wheel controlled locking mechanism effects the operation of elements which prevent the machine from performing a further value printing operation.

Since many changes could be made in the embodiment of the invention as particularly described and shown herein without departing from the scope of the invention, it is intended that this embodiment be considered as exemplary and that the invention not be limited except as warranted by the following claims.

What is claimed is:

1. A metering machine comprising a resettable register; an actuating member; a combination lock adapted to be unlocked upon entry of the correct combination thereinto and operatively connected to prevent operation of said actuating member when locked and to permit operation of said actuating member when unlocked; and means operatively connected for actuation by said actuating member for simultaneously resetting said register and altering the correct combination according to a predetermined random pattern.

2. A metering machine comprising a resettable register; an actuator; a combination lock adapted to be unlocked upon entry of the correct combination thereinto and operatively connected to prevent operation of said actuator when locked and to permit operation of said actuator when unlocked; and means operatively conected with said actuator for simultaneously resetting said register, altering the correct combination according to a predetermined random pattern, and relocking said combination lock, all upon operation of said actuator.

3. In a locking device; a combination lock adapted to be unlocked when the correct combination is entered thereinto; said combination lock including a plurality of tumblers; each of said tumblers including a pair of members; and means for moving the two members of all of said pairs relative to each other to alter said correct combination; said means including a differential unit for each of said pairs of members; each of said differential units including two freely movable slave elements and a master element so interconnected that relative movement between said slave elements is prevented when said master element is held stationary and a given amount of movement of said master element effects a proportional amount of relative movement between said slave elements; each one of the two slave elements of each differential unit being drivingly connected to one of the two members of each of said tumblers; and means for holding the master element of each of said differential units stationary until the correct combination is to be altered.

4. In a locking device; a combination lock adapted to be unlocked when the correct combination is entered thereinto; said combination lock including a plurality of tumblers; each of said tumblers including a pair of members; and means for moving the two members of all of said pairs relative to each other variable amounts according to respective predetermined random patterns to alter said correct combination according to a predetermined random pattern; said means including a differential unit for each of said pairs of members; each of said differential units including two freely movable slave elements and a master element so interconnected that relative movement between said slave elements is prevented when said master element is held stationary and a given amount of movement of said master element effects a proportional amount of relative movement between said slave elements; each one of the two slave elements of each differential unit being drivingly connected to one of the two members of each of said tumblers; said means further including a driver for driving the master element of each of said differential units a variable amount according to a predetermined random pattern each time the driver is actuated; and said means also including a common member for actuating all of the drivers.

5. In a locking device; a combination lock adapted to be unlocked when the correct combination is entered thereinto; said combination lock including a plurality of tumblers; each of said tumblers including a pair of members; and means for moving the two members of all of said pairs relative to each other variable amounts according to respective predetermined random patterns to alter said correct combination according to a predetermined random pattern; said means including a differential unit for each of said pairs of members; each of said differential units including two freely movable slave elements and a master element so interconnected that relative movement between said slave elements is prevented when said master element is held stationary and a given amount of movement of said master element effects a proportional amount of relative movement between said slave elements; each one of the two slave elements of each differential unit being drivingly connected to one of the two members of each of said tumblers; said means further including a variable-output mechanism for each of said differential units; each of said variable-output mechanisms including an input member and an output member so interconnected that a constant amount of movement of said input member effects a variable amount of movement of said output member according to a predetermined random pattern; said output member of each of said variable-output mechanisms being drivingly connected to the master element of the respective one of said differential units; and a common actuator drivingly connected to the input member of all of said variable-output mechanisms.

6. A metering machine comprising a resettable register; an actuator; a combination lock adapted to be unlocked upon entry of the correct combination thereinto and operatively connected to prevent operation of said actuator when locked and to permit operation of said actuator when unlocked; said combination lock including a plurality of tumblers; each of said tumblers including a pair of members; means for moving the two members of all of said pairs relative to each other variable amounts according to respective predetermined random patterns to alter said correct combination according to a predetermined random pattern; said means including a differential unit for each of said pairs of members; each of said differential units including two freely movable slave elements and a master element so interconnected that relative movement between said slave elements is prevented when said master element is held stationary and a given amount of movement of said master element effects a proportional amount of relative movement between said slave elements; each one of the two slave elements of each differential unit being drivingly connected to one of the two members of each of said tumblers; said means further including a variable-output mechanism for each of said differential units; each of said variable-output mechanisms including an input member and an output member so interconnected that a constant amount of movement of said input member effects a variable amount of movement of said output member according to a predetermined random pattern; said output member of each of said variable-output mechanisms being drivingly connected to the master element of the respective one of said differential units; and means drivably connecting said actuator with said register, with said combination lock and with all of said input members for simultaneously resetting said register, relocking said combination lock and driving all of said input members the respective constant amounts, all upon operation of said actuator.

7. A metering machine comprising a resettable register; an actuator; a combination lock adapted to be unlocked upon entry of the correct combination thereinto and operatively connected to prevent operation of said actuator when locked and to permit operation of said actuator when unlocked; said combination lock including a plurality of tumblers; each of said tumblers including a pair of members; means for moving the two members of all of said pairs relative to each other variable amounts according to respective predetermined random patterns to alter said correct combination according to a predetermined random pattern; said means including a differential gear unit for each of said pairs of members; each of said differential gear units including two freely movable slave gears and a master gear so interconnected that relative movement between said slave gears is prevented when said master gear is held stationary and a given amount of movement of said master gear effects a proportional amount of relative movement between said slave gears; each one of the two slave gears of each differential unit being drivingly connected to one of the two members of each of said tumblers; said means further including a variable-output gear mechanism for each of said differential gear units; each of said variable-output gear mechanisms including an input gear and an output gear so interconnected that a constant amount of movement of said input gear effects a variable amount of movement of said output gear according to a predetermined random pattern; said output gear of each of said variable-ouput gear mechanisms being drivingly connected to the master gear of the respective one of said differential gear units; and means drivably connecting said actuator with said register, with said combination lock and with all of said input gears for simultaneously resetting said register, relocking said combination lock and driving all of said input gears the respective constant amounts, all upon operation of said actuator.

8. In combination: a combination lock adapted to be unlocked upon entry of the correct combination thereinto; an actuating member operatively arranged for actuating movement when said lock is unlocked and prevented from effecting said actuating movement when said lock is locked; said combination lock including means adapted to be driven for altering said correct combination; and a variable-output mechanism operatively interconnecting said means and said actuating member for driving said means a variable amount according to a predetermined random pattern each time said actuating movement of said actuating member is effected.

References Cited in the file of this patent

UNITED STATES PATENTS

| | | |
|---|---|---|
| 1,317,221 | Roshon | Sept. 30, 1919 |
| 1,801,299 | Ashton | Apr. 21, 1931 |

UNITED STATES PATENT OFFICE
CERTIFICATE OF CORRECTION

Patent No. 3,034,329 May 15, 1962

Robert C. Pitney et al.

It is hereby certified that error appears in the above numbered patent requiring correction and that the said Letters Patent should read as corrected below.

Column 11, line 50, strike out "mutilated gear 224, the associated full tooth ge" and insert instead -- Geneva pinion to lock the latter in each of --.

Signed and sealed this 28th day of August 1962.

(SEAL)
Attest:

ESTON G. JOHNSON
Attesting Officer

DAVID L. LADD
Commissioner of Patents